United States Patent
Fujita et al.

(10) Patent No.: US 7,099,490 B1
(45) Date of Patent: Aug. 29, 2006

(54) INFORMATION PROVIDING SYSTEM AND IDENTIFICATION INFORMATION ADDING DEVICE

(75) Inventors: Takeshi Fujita, Ichikawa (JP); Hitoshi Endoh, Kasukabe (JP); Nariaki Hatta, Tokyo (JP); Yasufumi Fujikawa, Kanagawa (JP)

(73) Assignees: Sony Corporation, Tokyo (JP); Visionarts, Inc., Tokyo (JP)

( * ) Notice: Subject to any disclaimer, the term of this patent is extended or adjusted under 35 U.S.C. 154(b) by 680 days.

(21) Appl. No.: 10/110,819

(22) PCT Filed: Oct. 20, 2000

(86) PCT No.: PCT/JP00/07323

§ 371 (c)(1),
(2), (4) Date: Apr. 17, 2002

(87) PCT Pub. No.: WO01/29705

PCT Pub. Date: Apr. 26, 2001

(30) Foreign Application Priority Data

Oct. 21, 1999 (JP) .................................. 11-298958
Mar. 21, 2000 (JP) ............................. 2000-079183
Aug. 3, 2000 (WO) ........................ PCT/JP00/05228

(51) Int. Cl.
*G06K 9/00* (2006.01)
*G06K 9/60* (2006.01)
*G06F 7/00* (2006.01)
*G06F 15/173* (2006.01)

(52) U.S. Cl. .................... 382/100; 382/305; 707/104.1; 709/224

(58) Field of Classification Search ................ 382/100, 382/305; 707/104.1
See application file for complete search history.

(56) References Cited

U.S. PATENT DOCUMENTS

| 4,581,656 A | * | 4/1986 | Wada .......................... 358/437 |
| 5,740,549 A | * | 4/1998 | Reilly et al. ................... 705/14 |
| 5,761,404 A | * | 6/1998 | Murakami et al. ............ 714/15 |
| 5,842,023 A | * | 11/1998 | Tsumura ...................... 717/170 |
| 6,131,162 A | * | 10/2000 | Yoshiura et al. ............. 713/176 |
| 6,212,554 B1 | * | 4/2001 | Roskowski ................. 709/217 |

(Continued)

FOREIGN PATENT DOCUMENTS

JP         7 210653          8/1995

(Continued)

*Primary Examiner*—Bhavesh M. Mehta
*Assistant Examiner*—Anthony Mackowey
(74) *Attorney, Agent, or Firm*—Frommer Lawrence & Haug LLP; William S. Frommer; Thomas F. Presson

(57) ABSTRACT

The present invention has an object to facilitate investigation of access status in internet.

To achieve this object, when the HTTP server (203) transmits prescribed image data, identity information meeting the access from the terminal unit (30) is generated in the identity information adding process (205), and added to prescribed image data. The corresponding relationship between the identity information and the image data containing the added identity information is recorded in the database (206).

8 Claims, 13 Drawing Sheets

U.S. PATENT DOCUMENTS

| | | |
|---|---|---|
| 6,298,446 B1 * | 10/2001 | Schreiber et al. ........... 713/201 |
| 6,366,298 B1 * | 4/2002 | Haitsuka et al. ............ 715/736 |
| 6,393,479 B1 * | 5/2002 | Glommen et al. .......... 709/224 |
| 6,477,649 B1 * | 11/2002 | Kambayashi et al. ......... 726/27 |
| 6,487,538 B1 * | 11/2002 | Gupta et al. .................. 705/14 |
| 6,513,118 B1 * | 1/2003 | Iwamura .................... 713/176 |
| 6,603,864 B1 * | 8/2003 | Matsunoshita .............. 382/100 |
| 6,654,725 B1 * | 11/2003 | Langheinrich et al. ........ 705/14 |
| 6,775,023 B1 * | 8/2004 | Fukunaga et al. ......... 358/1.15 |
| 2002/0052975 A1 * | 5/2002 | Yamamoto et al. ......... 709/251 |

FOREIGN PATENT DOCUMENTS

| | | |
|---|---|---|
| JP | 10 124428 | 5/1998 |
| JP | 10 187825 | 7/1998 |
| JP | 11167603 A * | 6/1999 |

* cited by examiner

FIG. 3

GENERATION LOG

| Address | HOST NAME | DAY AND TIME OF ACCESS | FILE NAME | IDENTITY INFORMATION |
|---|---|---|---|---|
| 10.0.0.1 | a.ne.jp | 1999/10/10 10:10 | a.jpg | 28784 |
| 10.0.0.2 | b.co.jp | 1999/10/10 10:11 | b.gif | 1 |
| 10.0.0.3 | c.go.jp | 1999/10/10 10:12 | c.tif | 453 |
| 10.0.0.4 | d.com | 1999/10/10 10:13 | d.bmp | 6899 |

FIG. 5

UPDATE LOG

| ADDRESS | HOST NAME | DAY AND TIME OF ACCESS | FILE NAME | IDENTITY INFORMATION | GENERATING SERVER | CLIENT ID |
|---|---|---|---|---|---|---|
| 10.0.0.1 | a.ne.jp | 1999/10/10 10:10 | a.jpg | 367 | 1 | 100 |
| 10.0.0.2 | b.co.jp | 1999/10/10 10:11 | b.gif | 498 | 2 | 101 |
| 10.0.0.3 | c.go.jp | 1999/10/10 10:12 | c.tif | 8790 | 3 | 102 |
| 10.0.0.4 | d.com | 1999/10/10 10:13 | d.bmp | 980 | 4 | 103 |

| IMAGE NAME | RPG LEGEND 2 |
|---|---|
| PASSWORD | abc123 |
| EXPIRATION DATE | 00/3/21 |
| THUMBNAIL IMAGE | |
| CATEGORY | GAME SOFTWARE |
| KEYWORD | ... |

(b)

| POINTER INFORMATION | COMMAND NAME | ACTION TABLE | ALLOCATION OF MOUSE OPERATION | PLATFORM |
|---|---|---|---|---|
| http://www... | HOMEPAGE | NON-STORE/BROWSE | DOUBLE CLICK | NO LIMIT |
| http://www... | DEMONSTRATION IMAGE | NON-STORE/IMAGE REPRODUCE | SHIFT+DOUBLE CLICK | NO LIMIT |
| http://www... | STORY | STORE/TELOP DISPLAY | SINGLE CLICK | NO LIMIT |
| http://www... | THEME MUSIC | NON-STORE/AUDIO-REPRODUCE | ALT+DOUBLE CLICK | NO LIMIT |
| http://www... | RPG LEGEND 1 | NON-STORE/IMAGE ADD | CTRL+DOUBLE CLICK | NO LIMIT |

# INFORMATION PROVIDING SYSTEM AND IDENTIFICATION INFORMATION ADDING DEVICE

TECHNICAL FIELD

The present invention relates to an information providing system and the like providing information via a network such as internet. In particular, the invention relates to an information providing system and the like which enable to easily conduct investigation of an access status of the user by use of identity information added to image data.

BACKGROUND ART

WWW (World Wide Web) services provided by many HTTP (Hyper Text Transfer Protocol) servers connected to internet can easily be utilized by operating HTTP perusal software such as a Web browser executed on a user terminal connected to internet.

Operation of a Web browser has been facilitated by introduction of GUI (Graphical User Interface). The number of HTTP servers in use connected to internet is rapidly increasing. This tendency makes it easy for users to obtain many pieces of information, and WWW services have rapidly become popular.

Recently, commercial transactions have been made through WWW services. Because of the possibility to easily investigate access status of the user as compared with ordinary commerce, it has been now used also for marketing activity.

For carrying out such an investigation, the following methods are known:

(1) Storing identity information intrinsic to the each user using HTTP perusal software such as a so-called Web browser, such as Cookie or the like on the user terminal, an HTTP server acquiring this identity information when the user makes an access to the HTTP server, and recording and analyzing user's accesses to the information provided by the HTTP server;

(2) Analyzing a transmission packet from the user terminal connected to an internet service provider (hereinafter simply referred to as an ISP (Internet Service Provider)), and recording and analyzing user's accesses to the information provided by the HTTP server; and (3) Recording and analyzing user's accesses, separately from information provided by the HTTP server and access log of the HTTP server, by an application independent of the HTTP server such as access analyzing software and the like.

To put it specifically, there is a method of recording information corresponding to user access in a file by use of the Java (trademark) applet adopted, for example, in http://www.snippet.com/home.htm or the like.

However, in the aforementioned method (1), there has been room for improvement in terms of certainty, for example, in that Cookie cannot be used for some set conditions of the HTTP perusal software executed at the user terminal.

Because issuance and management of Cookie are accomplished for each HTTP server, it is impossible to carry out an investigation of access status in cooperation with the other HTTP server. In order to investigate access status of the user to a plurality of HTTP servers, therefore, it is necessary to unify access status data for the individual HTTP servers, and a larger number of servers makes it difficult to conduct such an investigation.

In the aforementioned method (2), when investigating access status to an external HTTP server managed outside the ISP used for the user to connect to internet, objects of investigation increase because of a very large number of HTTP servers connected to internet, thus making it very difficult to accomplish investigation.

In the aforementioned method (3), it is necessary to operate an application for carrying out the investigation and to analyze logs, separately from management of information and logs provided by the HTTP server, and also to conduct complicated operations such as specification of an HTTP server to be investigated, thus preventing easy accomplishment of the investigation.

The present invention was made in view of the problems mentioned above, and has an object to provide an information providing system permitting relatively easy investigation of the status of user access.

DISCLOSURE OF INVENTION

The present invention is characterized by generation of intrinsic identity information meeting an access from a terminal, addition of the thus generated identity information to prescribed image data provided by an informant server unit, and recording of the corresponding relationship between the identity information and the image data containing the added identity information.

Applicable informant servers include an HTTP server operating on a general-purpose OS, an application software program such as a file server, and other means such as processes incorporated in a specialized OS, and a dedicated software program.

Applicable terminals include an HTTP perusal software operating on a general-purpose OS, processes incorporated in a specialized OS, and means such as a dedicated software program.

Applicable means or processes generating intrinsic identity information meeting an access from the terminal include an expansion program of an HTTP server, an independent software program monitoring and controlling accesses to image files, and hardware means having similar functions.

Applicable means and processes recording the corresponding relationship between the identity information and image data containing the added identity information include software programs operating independently within a server unit, means such as a logging function of an HTTP server, and means such as software operating outside a server unit.

An accounting unit of another aspect of the invention comprises receiving means which, in the presence of image data containing added intrinsic identity information meeting an access from an information use terminal, receives the image identity information extracted by the information use terminal from the image data from the information use terminal, and receives terminal identity information of the information use terminal; storage means which correlates and stores the date of the image identity information and the terminal identity information received by the receiving means; and information processing means which determines whether or not the same combination of image identity information and terminal identity information has already been stored in the storage means, so that accounting is not made when the combination is stored, and accounting is made when the combination is not stored.

Another accounting unit of the invention comprises receiving means which, in the presence of image data containing added identity information meeting an access from an information use terminal, receives the image identity information extracted by the information use terminal from the image data from the information use terminal, and receives terminal identity information of the information use terminal; storage means which correlates and stores a date on which the receiving means received the image identity information and terminal identity information, with the image identity information and terminal identity information; and information processing means which determines whether or not the same combination of image identity information, terminal identity information and the receiving date has already been stored in the storage means, so that accounting is not made when the combination is stored, and accounting is made when the combination is not stored.

In the accounting unit, user identity information of the user using the information use terminal is used in place of the terminal identity information.

BRIEF DESCRIPTION OF DRAWINGS

FIG. 3 illustrates an example of a table (generation log) recorded by a database of the aforementioned server unit;

FIG. 5 illustrates an example of a table (update log) recorded by a database of the aforementioned server unit;

FIG. 7 illustrates an example of image-related information;

BEST MODE FOR CARRYING OUT THE INVENTION

Figure 1:
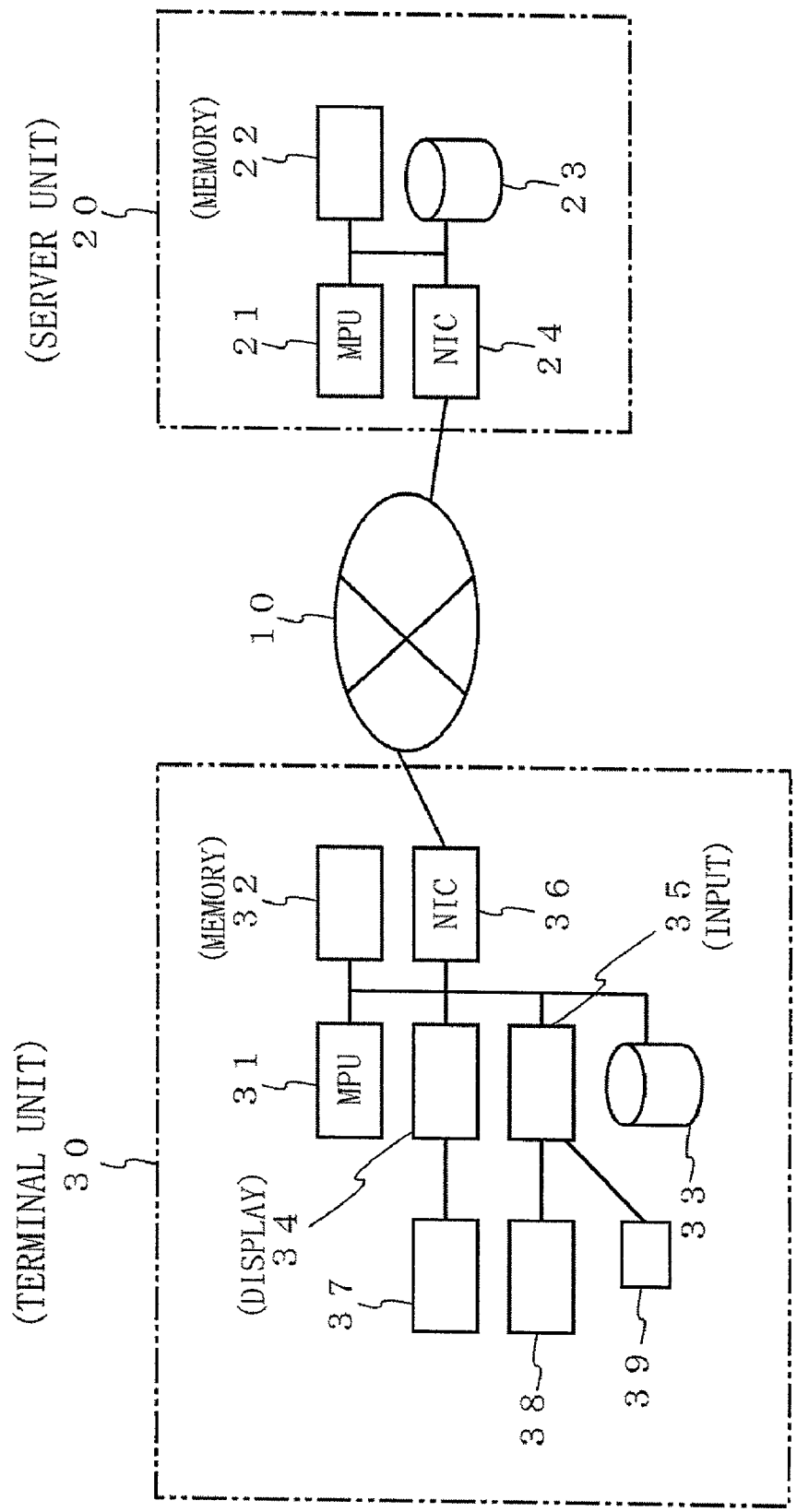
FIG. 1 is a block diagram illustrating an information providing system of an embodiment of the present invention.

FIG. 1 is a block diagram illustrating the configuration of an information providing system of an embodiment of the present invention.

This information providing system has a server unit 20 connected via a network 10 such as internet, and a terminal unit 30. In FIG. 1, each one server unit 20 connected to the network 10 and one terminal unit 30 are shown for convenience' sake. There is no particular limitation however on the number of server units 20 and terminal units 30.

The server unit 20 comprises a microprocessor (MPU) 21, a memory 22, a hard disk drive unit (HDD) 23 storing an operating system (OS), software such as an HTTP server, text data, and image data and the like, and a network interface (NIC) 24 and so on.

The terminal unit 30 comprises a microprocessor (MPU) 31, a memory 32, an HDD 33 storing an operating system (OS) and an HTTP perusal software (Web browser), a display interface 34, an input interface 35, and a network interface (NIC) 36 and so on.

A display unit 37 is connected to the display interface 34, which displays an OS operating screen and a display screen of the Web browser or the like. Keyboard 38 and Pointing devices 39 such a mouse are connected to the input interface 35. An instruction of the user or the like is entered via these peripheral devices.

Figure 2:
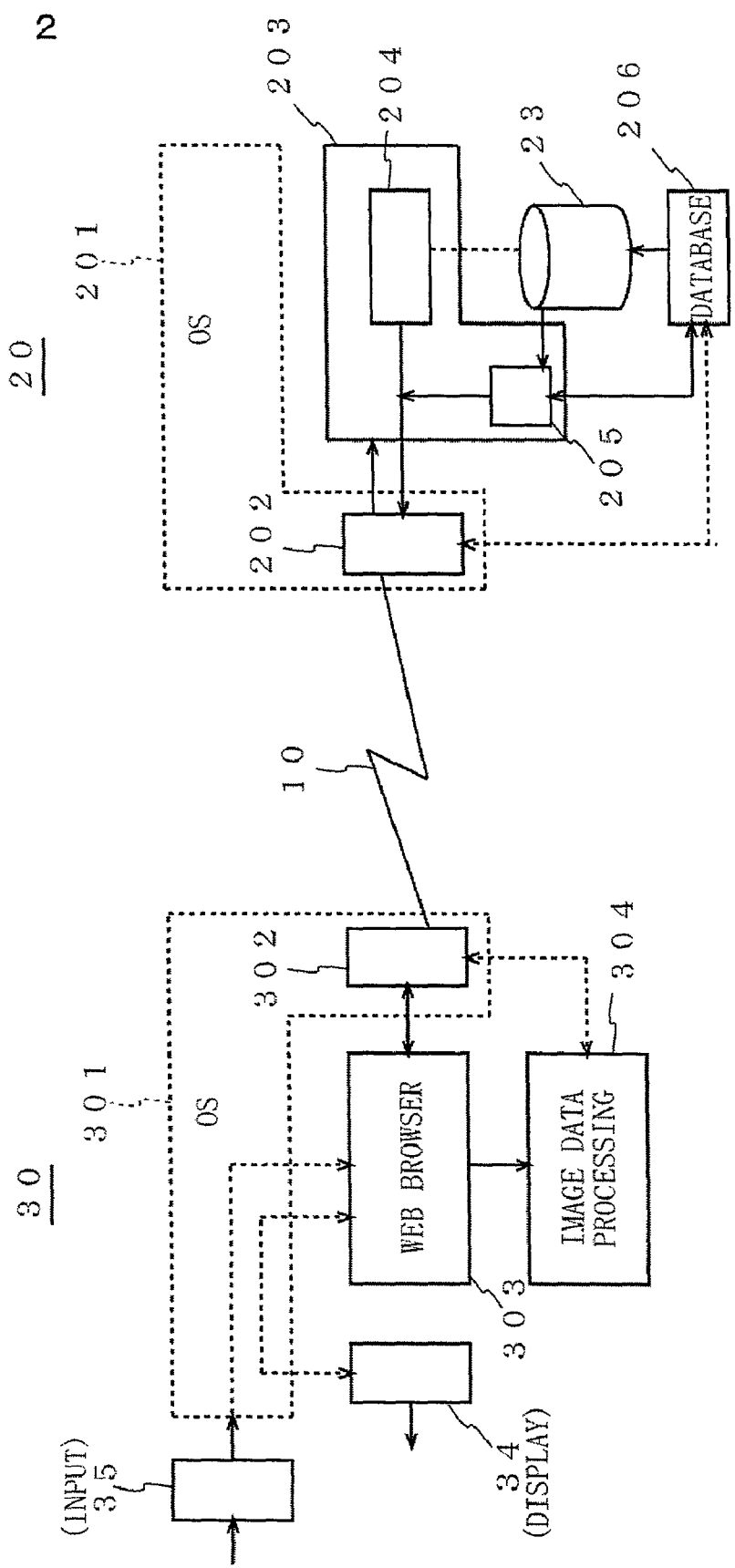
FIG. 2 is a conceptual view schematically illustrating operations of a server unit and a terminal unit composing the information providing system shown in FIG. 1.

FIG. 2 is a conceptual diagram schematically showing functional blocks of the server unit 20 and the terminal unit 30.

In the server unit 20, under the control by the OS 201, control of the entire unit, communication control process 202 allocating the communication process to prescribed services such as Telnet, FTP and HTTP on the basis of port information and the like, and the process of the HTTP server 203 are performed in parallel.

Similarly, in the terminal unit 30, under the control by the OS 301, processes such as control of the entire unit, communication control process 302, control of input from the user, and the Web browser 303 are executed in parallel.

An outline of general operations of the Web browser 303 and the HTTP server 203 will now be described.

When entering a target address (URL: Uniform Resource Locator; having a portion specifying the host name of the server unit in which the HTTP server is executed, and a portion specifying the file name) by operating the terminal unit 30 from the user via the input interface 35, the Web browser 303 sends a connection request including the file name to the server unit 20 corresponding to the host name. This connection request is supplied to the destination server unit 20 via the communication control process 302 and the network 10, and supplied to the HTTP server 203 via the communication control process 202.

When the connection request is supplied, the HTTP server 203 reads out data corresponding to the file name given in the connection request from the HDD 23, and transmits the same to the terminal unit 30.

The URL specified first by the user may indicate in some cases only the host name, or only the host name and a specific directory. In such a case, the root directory of that host or a standard name file (index.html) present in the indicated directory is read out and transmitted to the terminal unit 30.

In such a standard name file, or the file specified by the user, character indication, image indication and linkage to the other files or the like are described in accordance with HTML (Hyper Text Markup Language).

The file from the HTTP server 203 is supplied to the Web browser 303 via the network 10 and the communication control process 302 of the terminal unit 30. The Web browser 303 generates display image data in accordance with the description in this file, and supplies the same to the OS 301. The OS 301 forms an image in the window assigned to the Web browser from the display image data from the Web browser 303, and causes the display screen of the display unit 37 to display the same via the display interface 34.

When image display is specified, together with the file name of the image data in the file supplied from the HTTP server 203, for example, the Web browser 303 requests the HTTP server 203 to transmit the image data corresponding to that file name.

Upon receipt of such a transmission request, HTTP server 203 reads out the image data of the requested file name from the HDD 23, and transmits it to the Web browser 303.

Upon receipt of the image data, the Web browser 303 treats the received image data as the image data at a prescribed position in the aforementioned display image data, and supplies the same to the OS 301.

As a result, an image based on the received image data at the prescribed position in the window of the Web browser 303 is displayed.

General operations of the Web browser and the HTTP server have been described above. Characteristic operations of the information providing system of this embodiment will now be described.

In the server unit 20, as shown in the aforementioned FIG. 2, when the HTTP server 203 transmits particular image data, there are executed an identity information adding process 205 which adds intrinsic identity information meeting an access from the user to the image data, and a database 206 recording individual pieces of identity information are executed.

The identity information adding process 205 is mounted in the form of an extended program (so-called plug-in) of the HTTP server 203. When a file delivery process 204 reads out the file of particular image data from the HDD 23 and transmits the same, the identity information adding process 205 adds intrinsic identity information meeting user's access to the image data.

The identity information added to the image data suffices to be information intrinsic to the individual accesses. It is therefore possible to generate it on the basis of information such as the date and time of access to the IP address and server of the terminal unit 30 currently operated by the user. Or, the identity information to be added to the image data may be generated by use of intrinsic identity information imparted to each user or each terminal unit 30 to the image data process 304 handling the image data containing the added identity information, as described later.

On the contrary, the date and time of access itself may be used as the identity information. Since two or more accesses to one server unit 20 are never processed simultaneously in the usual course of operation, the date and time of access may be the information specifying an access. Even when adding the date and time of access to the image data as identity information, therefore, it is possible to identify individual image data.

A function of recording an access log from the user is mounted as a function of the HTTP server. The IP address, the date and time of access and the like of the terminal unit 30 of the user using the HTTP server can be recorded in this access log. As a result, when using the date and time of access as identity information, the IP address corresponding to the date and time of access added to the image data is available by referring to the access log. It is therefore possible to easily specify an IP address of the user in access to the image data.

Because it suffices to add identity information so as to permit recognition as image data, it may, for example, be added in a vacant area defined on the image format, or it may be embedded in the image data, using the so-called electronic water-marking technique of adding the information in a dispersed form in the image data. It may also be added before or after the image data main body on the image format. The identity information may be added as it is to inhibit processing load, or may be added after subjecting the information to processing such as appropriate coding or enciphering for improvement of security.

The image data containing the thus added identity information are treated as ordinary image data on the file delivery process 204 and communication control process 202, and transmitted to the Web browser 303 of the terminal unit 30.

The database 206 acquires the information showing user's access status via the OS 201, the HTTP server 203 and the like, creates a table (generation log) representing the corresponding relationship between the identity information added through the identity information adding process 205 and the information showing user's access status, and records the thus created table in the HDD 23. As shown in FIG. 3, for example, this generation log contains the accessing IP address, the name of the host of the server unit 20 in which the HTTP server 203 is operating, the date and time of access, the file name of image data, and the identity information (ID) added by the identity information adding process 205 and so on.

As a result, by referring to the generation log (or the update log described later), The identity information added to the image data, and the information showing user's access status such as the accessing IP address and the date and time of access are available. It is therefore possible to relatively easily investigate user's access status and so on.

By the way, the identity information adding process 205 can add also information such as URL to the image data in addition to the identity information.

When adding URL to the image data, it is possible to make an access to a prescribed URL with reference to only the image data, by extracting this URL on the terminal unit 30 side, supplying this URL to the Web browser 303, and instructing an access.

Such a function has conventionally achieved by use of the HTTP server in the so-called banner advertising. In the banner advertising, it is necessary to provide processes such as defining a button for causing linking with the prescribed URL in accordance with HTML, and specifying the file name of the prescribed image data as the image of this button.

In this case, since the file defining URL is separate from the file of the image data, even a third party can easily refer only to the file of the image data as the image of a button of a link different from that of the original URL. That is, it would be easy to steal the image data for uses not intended by the maker of the image data.

As in this information providing system, in contrast, even if the image data are stolen, it is possible to easily specify a route of acquisition of the image data or the like with reference to the aforementioned generation log by previously adding intrinsic identity information meeting user's access status to the image data. Thus, it is effective for preventing illegal use of the image data.

Since identity information is added to the image data, it is possible to certainly retain identity information and to improve reliability of the result of investigation as compared with an investigation using the conventional Cookie and the like.

For example, by adding the aforementioned identity information to advertising image data such as banner advertising, it is possible for the sponsor to obtain result of investigation having a higher reliability than in the conventional art as to taste of the users. By using this result of investigation, it becomes possible to provide one-to-one services accurately coping with needs of the individual users.

While FIG. 2 illustrates an example in which the identity information adding process 205 is mounted as a extended program of the HTTP server 203, it suffices that there is provided a function of adding intrinsic identity information meeting a user's access to particular image data. Therefore, it is also possible to previously place the image file in a file server independent of the HTTP server, monitor accesses to this file server, and deliver the image data containing the added identity information meeting user's access upon receipt of an access request to a particular image file.

In this case, it is not always necessary that the HTTP server and the file server are mounted as separate units, but these units may be executed as a plurality of server programs and identity information adding processes or the like on a single OS. Or, it is also possible, by use of a so-called emulator, to cause execution of a plurality of OS on a single unit, cause execution of processes as an HTTP server on an OS, and cause execution of processes as a file server on the other OS. As a result, a physically single unit can execute processes equivalent to those of a plurality of units.

By separating the HTTP server and the file server or the like as described above, the access right or the like can be set separately for the HTTP server and the file server or the like, thus bringing about an improvement of flexibility in setting security. As a result, this can contribute to the improvement of security.

In the terminal unit 30, on the other hand, as shown in FIG. 2 mentioned above, execution of the application program operating in cooperation, for example, with the Web browser 303 causes execution of a process for handling the image data containing the added intrinsic identity information (image data processing) 304.

This image data process 304 execute a processing in response to the identity information from the image data upon receipt of the supplied image data containing the added identity information from the Web browser 303.

This processing includes management of performing storage, deletion, update and the like of the image data on the basis of the identity information, and in the case where information such as URL is added to the image data as described above, includes processing of execution in accordance with this information.

The individual processes will now be described in detail.

Figure 4:
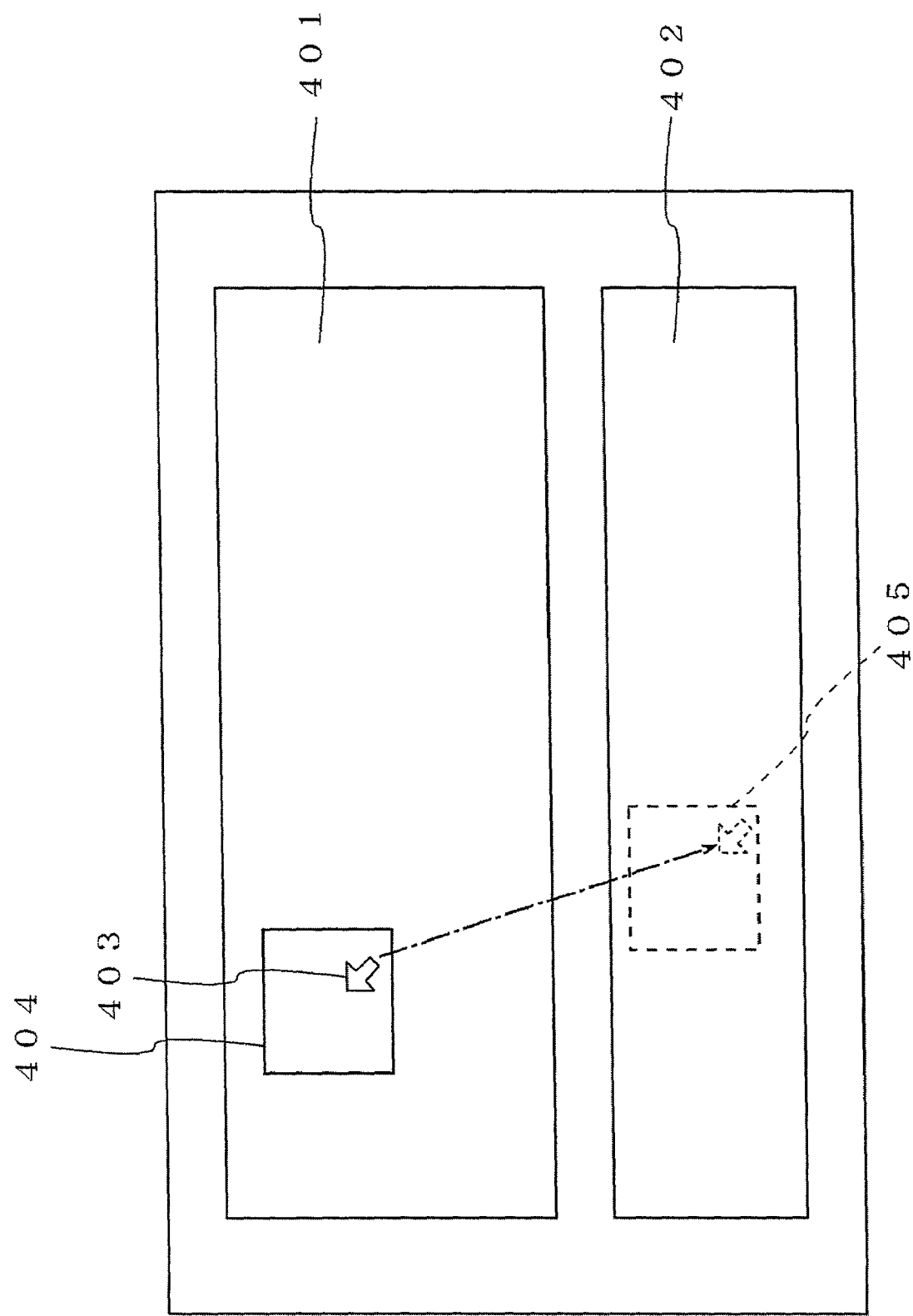
FIG. 4 illustrates an example of an image displayed on a display unit of the aforementioned terminal unit.

As shown in FIG. 4 illustrating an example of display screen of the display unit 37, a window 402 is assigned to this image data process 304 by the aforementioned OS 301 as in the window 401 of the Web browser 303.

Supply of the image data from the Web browser 303 to the image data process 304 can be accomplished through so-called drug-and-drop operation under control by the OS 301.

To put it specifically, in a state in which the user operates the pointing device 39 to have the pointer 403 agree with the display position of the image 404 displayed within the window 401 of the Web browser 303, and operates the button or the like of the pointing device 39, the image data are supplied from the Web browser 303 to the image data process 304 via the OS 301, by further operating the pointing device 39 to cause the pointer 403 to move onto the window 402 of the image data process 304, and releasing operation of the button of the pointing device 39 and the like.

Upon supply of the image data, the image data process 304 causes display of the image 405 corresponding to the supplied image data at the position of the pointer 403.

Storage of the image data is accomplished, when the image data are supplied through the aforementioned drag-and-drop operation, by the image data process 304 through storage in a prescribed area of the HDD 33 via the OS 301. And deletion of the image data is conducted by deleting the image data selected by user's instruction from the prescribed area of the above-mentioned HDD 33.

Update of the image data is performed for updating the stored image data into the latest ones. This update processing may be executed in compliance, for example, with user's instruction, or on the basis of information such as the date of preparation recorded in the file of the image data. It may be automatically executed at prescribed intervals.

After start of the update processing, the image data process 304 first extracts the identity information added to the image data to be updated, and transmits this identity information and the file name or the like to the HTTP server 203 and the database 206 to request update of the image data.

Such an update request is supplied to HTTP server 203 and the database 206 as a packet of a prescribed port via the communication control process 302, the network 10, and the communication control process 202.

Upon update, the image data process 304 may transmit the entire image data, and the HTTP server 203 or the database 206 may extract the identity information from the image data thus obtained.

And intrinsic identity information (client ID) is imparted for each user or for each terminal unit 30 to the image data process 304. This client ID is supplied to the HTTP server 203 and the database 206 as a packet for a prescribed port via the communication control process 302, the network 10, and the communication control process 202 upon updating the image data or the like.

The file delivery process 204 of the HTTP server 203 instructs the HDD 23 to read out the image data corresponding to the file name contained in the update request.

At this point, the identity information adding process 205 generates new identity information meeting user's access status and adds the same to the image data.

As a result, the image data containing new added identity information are supplied to the image data process 304 of the terminal unit 30 via a prescribed port, thus causing update of the image data.

On the other hand, the database 206 acquires information showing user's access status via the OS 201 and the HTTP server 203 or the like, prepares a table (update log) representing the corresponding relationship between the identity information added anew by the identity information adding process 205 and the information showing user's access status, and records the same in the HDD 23, separately from the generation log described above.

As shown in FIG. 5, this update log contains, like the generation log, the accessing IP address, the host name of the server unit 20 in which identity information has newly been added, the date and time of access (date and time of update), the file name of the image data, and the identity information added by the identity information adding process 205, and in addition, information for specifying the server unit 20 having generated the original identity information (generated server ID), and the client ID for specifying the user of the terminal unit 30 used by the user.

As a result, by referring to this update log, there is available information for updating the image data and for specifying the user or the terminal unit 30, in addition to user's access status resulting from the aforementioned generation log. That is, it is possible to relatively easily conduct an investigation of user tendency through image data update status.

By referring to the update log, there is available information for specifying the user or the terminal unit 30 corresponding to the identity information added to the image data, thus permitting more accurate identification of the route of acquisition of the image data and the like.

When information such as URL is added to the image data as mentioned above, the image data process 304 extracts the added information, and performs the process in accordance with the thus extracted information.

More specifically, if the added information is URL, the image data process 304 records this URL, and when access to the URL is instructed by the user, instructs the Web browser 303 to access the URL.

Therefore, the user can easily make an access to this URL by causing the image data containing the desired added URL to be supplied from the Web browser 303 to the image data process 304. That is, the image data serve as a link to a particular URL.

A so-called bookmark is known to have such a function. However, since the bookmark is stored as character information, it may sometimes be difficult to recognize an actual destination of linkage. The link based on image data, permitting immediate recognition of the link destination from the image, makes it possible to make an easy understanding as compared with a link based on characters.

The aforementioned banner advertising is known to show a link to a prescribed URL by means of an image. In this case, however, the image data and the link destination URL are independent of each other. By retaining the image data alone, therefore, the URL of the link destination is not retained.

Because a banner advertising may sometimes be updated in a short period of time, the same image data, i.e., the same link destination URL is not always available in the next access. In order to certainly retain a link destination URL, therefore, it is necessary to retain the link destination URL through preparation of the bookmark or the like.

If the information such as URL is an added image data, in contrast, simple storage permits extraction of the URL by means of the image data process 304 and access to this URL, thus facilitating operations.

While the aforementioned FIG. 2 covers a case where the image data process 304 is mounted as a process separate from the Web browser 303, it suffices to have a function of handling the information added to the image data, so that it may be mounted as an extended program (so-called plug-in) of the Web browser 303.

The present invention is not limited to the above-mentioned embodiment, but the configuration and the mounting method can be changed appropriately within the scope of technical idea of the invention.

In FIG. 1, for example, the server unit 20 and the terminal unit 30 have been shown as independent units. By executing a program carrying out the both processes, it is possible to ensure simultaneous execution of the server unit and the terminal unit.

The above-mentioned embodiment will now be described further in detail.

[Structure of Image File]

Figure 6:
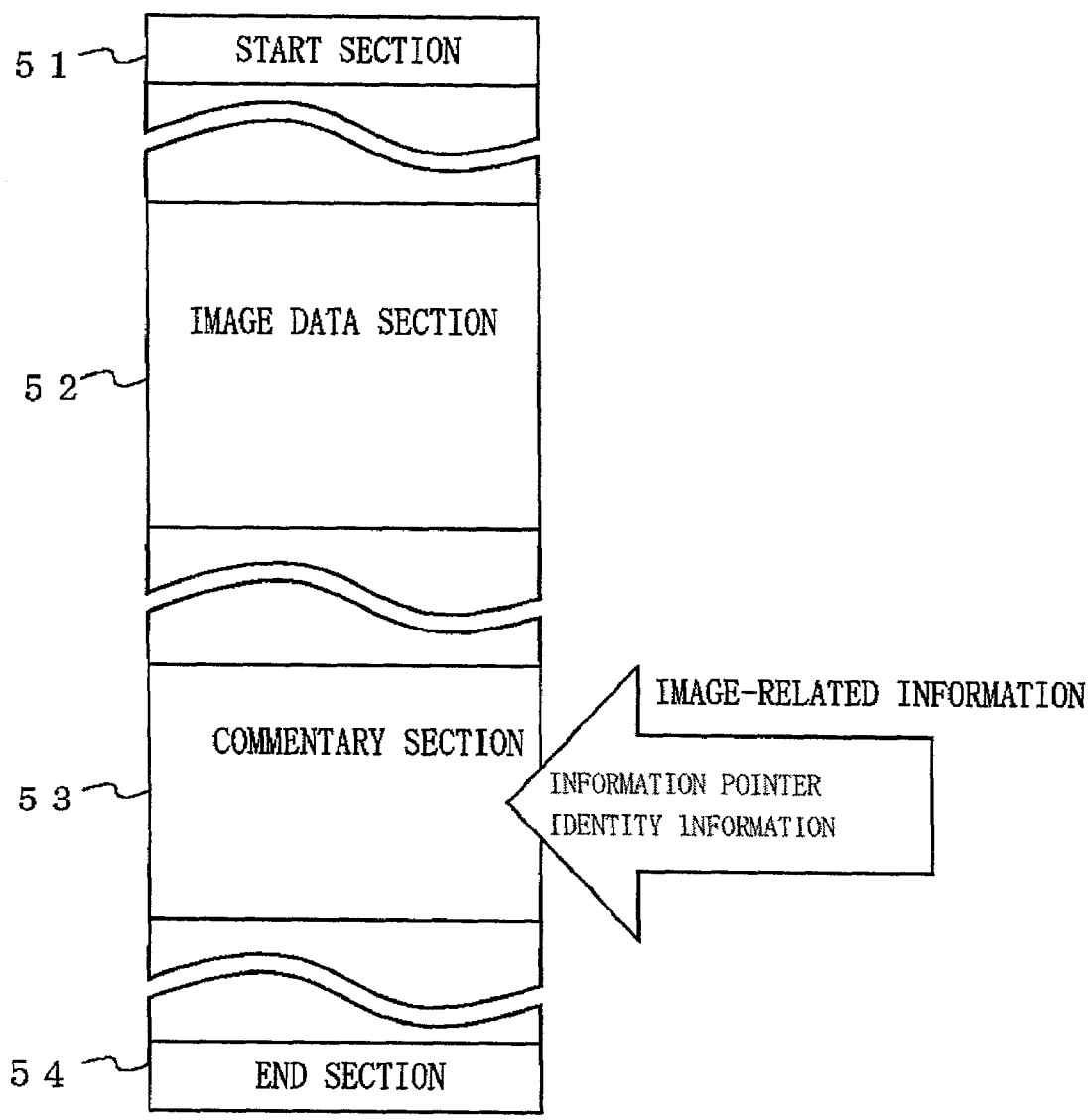
FIG. 6 is a configuration diagram of an information image file illustrating the storage configuration of image-related information.

FIG. 6 shows an example of data structure of the image file handled in the above-mentioned embodiment. The image file shown in FIG. 6 comprises a start section 51 indicating the start of a data stream, an image data section 52 describing the display data of the image, a comment section 53 describing information not affecting display of the image, and an end section 54 indicating the end of the data stream. For example, this data structure is adopted in a JPEG file and a GIF file. Identity information to be added to the aforementioned image data and pointer information such as URL can be described in the comment section 53 as those not affecting display of the image. Even for any other image format, a format having an area of information not affecting display of the image can be described in this area. Identity information intrinsic to the image file, one or more information pointers, an index of menu items corresponding to the image file, or/and actual contents of a program can be recorded in an area ignored upon display of the image in a data stream of the image file. Addition may be accomplished by the digital watermark technique to the image data, as described above.

In the following description, identity information added to the image data and pointer information are referred to as "image-related information". An image file containing image-related information added to the image data shall be called an "information image file".

[Structure of Image-Related Information]

FIG. 7 is a structure diagram of image-related information. The image-related information shown in FIG. 7(*a*) includes information regarding the name of image, password, expiration date, thumb nail image, category and keyword.

The "name of image" is the name of the image thumbnail-displayed in the window 402 of the image data process 304. The "password" is the password which the user is requested to enter upon supplying an information image file to the image data process 304. Only the user knowing this password can register an information image file in the image data process 304. The "expiration date" is an expiration date of the information image file supplied to the image data process 304. When the expiration date elapse, the information image file is deleted from the recording area of the HDD 33. The "thumb nail image" means data of the image file thumb-nail-displayed in the window of the image data process 304 in place of the image so far displayed on the browser upon supplying the information image file displayed on the browser to the window of the image data process 304. The "category" represents data specifying a folder in which the information image file is to be stored upon supplying the information image file to the image data process 304. When a specified folder is not present, the image data process 304 newly prepares a folder of a specified name. The "keyword" is a word serving as a retrieval key when retrieving an information image file already supplied by the image data process 304.

The image-related information shown in FIG. 7(*b*) comprises, for each pointer information, a set of command name, action table, allocation of mouse (pointing device) operations, and platform correlated with each other.

The "pointer information" specifies the location of a file on a local computer or on the network. For example, a file name, a path name indicating the location of resources present on a local computer, a UNC (Universal Naming Convention) indicating the location of resources in a network environment, or an URL (Uniform resource Locator) or URLs (Uniform Resource Identifiers) indicating the location of resources on internet or an intranet constitute pointer information. The "command name" is a display name used when displaying contents of a pointer on the menu, including, for example, "access to a home page". The "menu" means a menu displayed and becoming capable of being selected on display means 37 upon clicking the right button of the mouse 39. The "action table" specifies operations of the image data process 304. Details of the specified operations include whether or not a file indicated by the pointer information added to the information image file upon supply of the information image file to the image data process 304 is to be stored in the HDD 33 (storage means) of the terminal unit 30, whether or not that file is to be automatically executed, and the method of execution of that file (telop display, image reproduction, audio reproduction) or the like. The "allocation of mouse operations" sets mouse operations for making an access to the pointer information. The kinds of setting include double click, shift+double click, ctrl+double click, and alt+double click. The "platform" specifies an environment (platform, OS) befitting to a file indicated by the pointer information. For example, when the OS 301 is windows (trademark), the image data process 304 selects a corresponding information pointer in the windows and displays the same on the above-mentioned menu.

[Access to Pointer Information]

A method of accessing the pointer recorded in the information image file in the terminal unit 30 will now be described.

(1) Method Based on Menu Selection

Figure 8:
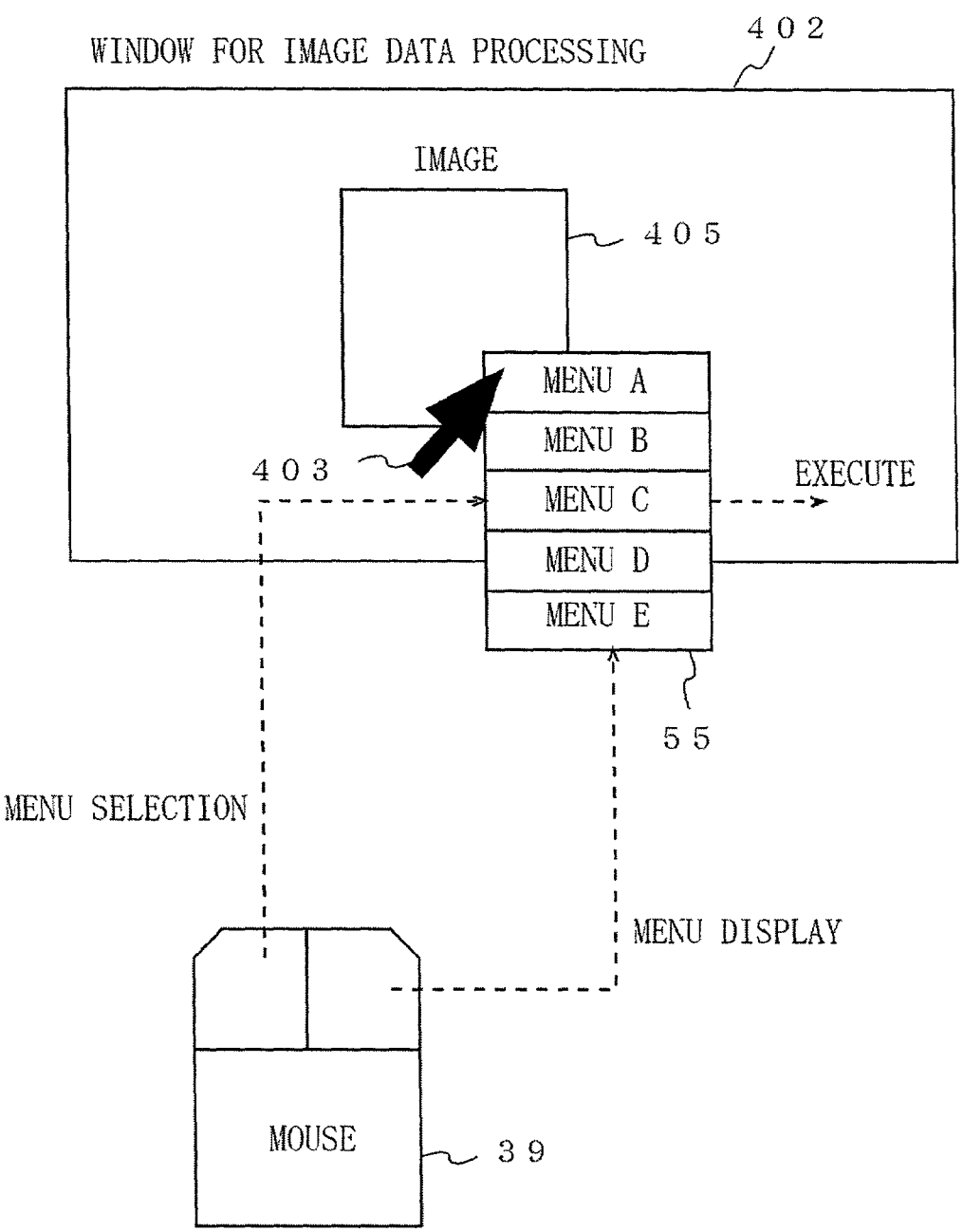
FIG. 8 is a descriptive view of an access to a pointer by menu selection.

FIG. 8 is a descriptive view of a method of accessing the pointer through menu selection. The user operates the mouse 39 (pointing device), and places the pointer 403 on the image 405 supplied to the window 402 of the image data process. Then, the user clicks the right button of the mouse 39. Upon detecting this click, the MPU 31 (information processing means) reads out image-related information (FIG. 7(b)) contained in the information image file corresponding to the image 405 from the recording means 33, and generates menu display data. In other words, the MPU 31 extracts the "command name" as a menu item, and displays the menu 55 on the display means 37. Then, the user operates the mouse 39 to move the pointer 403, and places the same on the menu item to be selected. The user clicks the left button of the mouse 39 to select and decides one menu item. Upon detection of this click, the MPU 31 refers to the image-related information (FIG. 7(b)), and accesses the pointer by entering the pointer information corresponding to the selected command name in the browser 303. Upon receipt of the file returned from the server in response to the access destination, the MPU 31 executes the received file in accordance with the action table corresponding to the command name selected this time. For example, the MPU 31 executes reproduction of an image based on the Realplayer (trademark).

The menu items displayed when clicking the image displayed in the window 402 of the image data process are dependent upon contents of the image-related information embedded in the information image file. The information image file containing the image-related information has been transmitted from the server unit 20. That is, the menu items displayed by mouse clicking are characterized in that they depend upon information downloaded from the server unit 20.

(2) Method Based on Mouse Operation

When button operation of the mouse 39 or key operation of the keyboard 38 are performed in a state in which the window 402 of the image data process has been selected, access to a prescribed information pointer is made possible in response to these operations. Upon operation of the mouse 39 or operation of the keyboard 38, the MPU 31 refers to the image-related information and to the "allocation of mouse operations" (FIG. 7(b)), and determines whether or not the corresponding operations are defined. When the corresponding operations are defined, the MPU 31 reads out the pointer information corresponding to these operations, and accesses that pointer by entering the pointer into the browser 303. Upon receipt of the file returned from the server in response to the access destination, the MPU 31 executes the received file in accordance with the action table corresponding to the command name selected this time. The same mouse operation may be allocated to a plurality of actions.

[Specific Examples of Access to Information Pointer]

Figure 9:
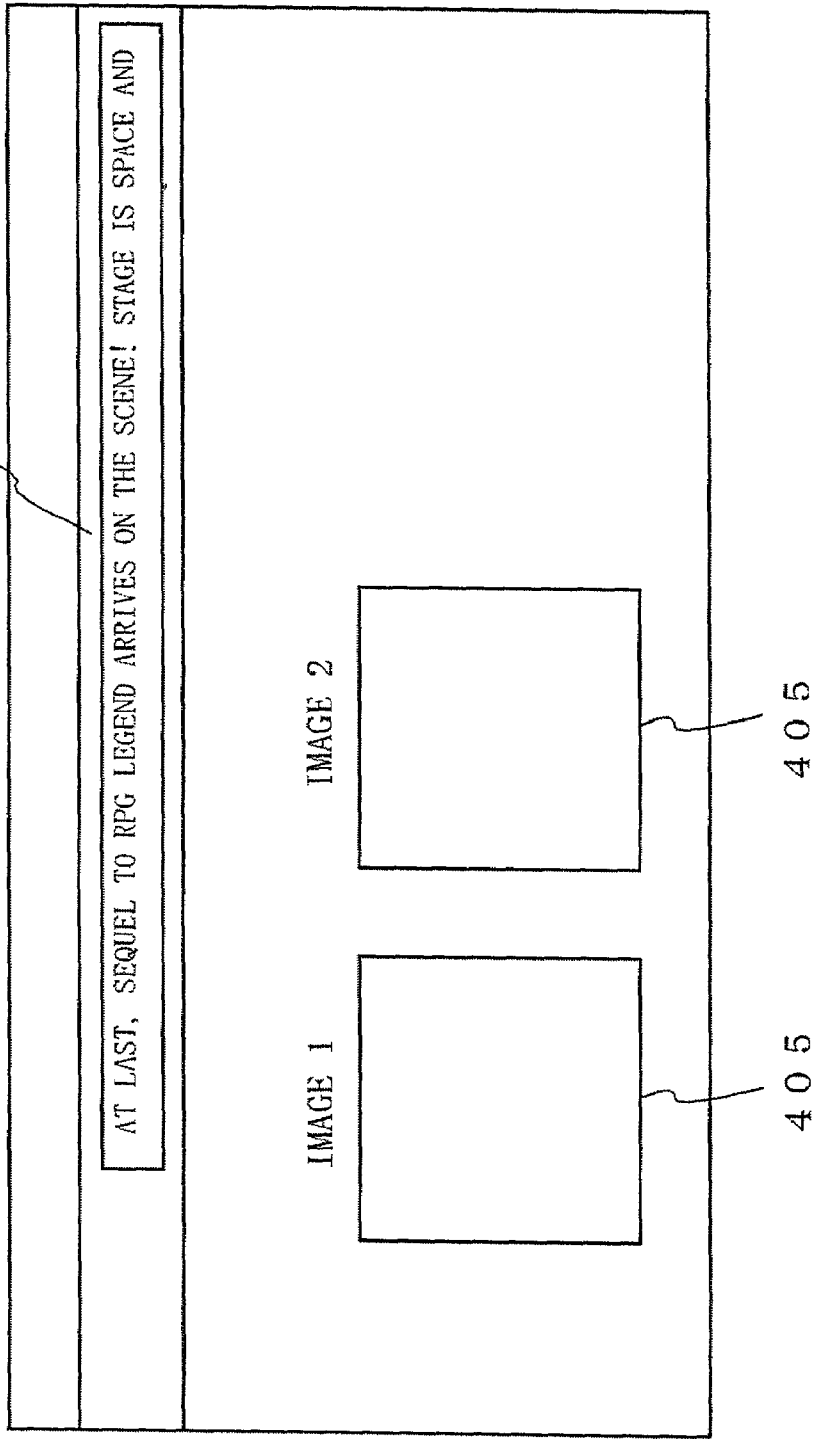
FIG. 9 is a descriptive view of a telop display processing.

A specific example of operation made when accessing an information pointer will now be described. An example of the "telop display" shown in the action table of FIG. 7(b) will be described here. FIG. 9 is a descriptive view of telop display operations. When defining the "telop display" in the action table, the pointer storing the telop text file is specified in the corresponding pointer information, and simultaneous accomplishment of storage of the text file in the local disk upon downloading the information image file is specified in the action table. Action (control code) of telop display is specified. For the allocation of mouse operations, for example, single click of the left button is specified (these settings are made usually by the information image provider on the server side).

When the information image file having the image-related information is supplied from the browser 303 to the image data process 304 in the terminal unit 30, the MPU 31 refers to the image-related information, and begins accessing the pointer having received the specification of "storage". The text file of telop is downloaded from the server corresponding to that pointer, and the same is stored in the local HDD 33.

Subsequently, when the user operates the mouse 39, and selects the image displayed in the window 402 of the image data process by clicking, the MPU 31 refers to the image-related information corresponding to the selected image, and confirms that the control code defined in the action table is the "telop display". Then, a long and slender window for telop-display is displayed in the area of window of the image data process (or outside the area) as shown in FIG. 9, and the telop text read out from the HDD 33 is scroll-displayed in this window. As shown in FIG. 9, when a plurality of images 405 are supplied, it is also possible to display different telops in response to the images selected by the mouse 39.

[Supply of Information Image File to Image Data Process]

In the above-mentioned embodiment, supply of the information image file to the image data process has been described as being capable of being accomplished through drag-and-drop operation from the window 401 of the browser to the window 402 of the image data process. Other methods of supply will be described here.

(1) Drag-and-Drop From Menu

Figure 10:
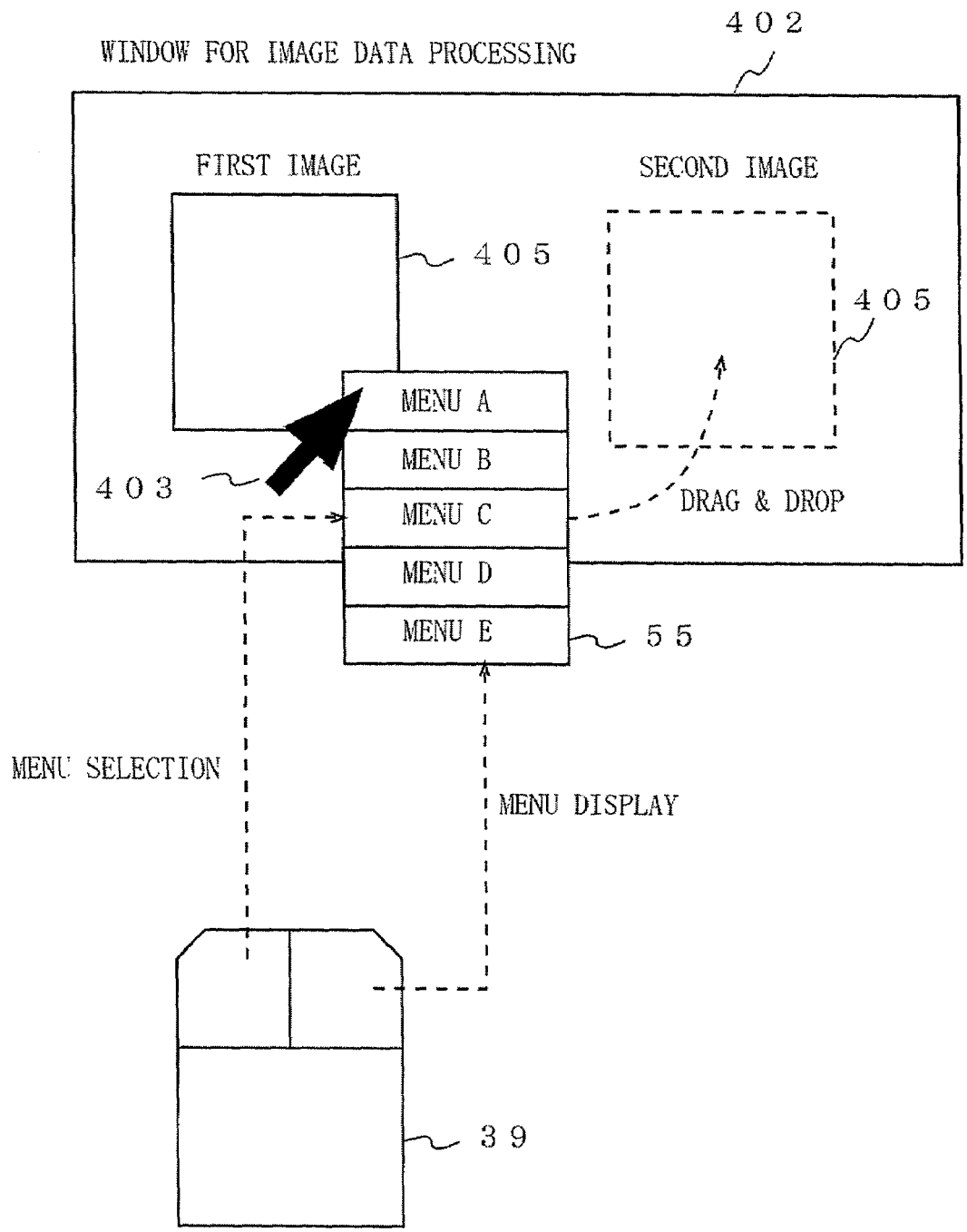
FIG. 10 is a descriptive view of addition of information image by drag-and-drop from the menu.

FIG. 10 is a descriptive view of drag-and-drop operation from the menu. As already explained, the menu 55 (first management area) is displayed by clicking the right button of the mouse 39, and a menu item for adding an information image is selected from the mouse 39. The menu for adding information image is selected by previously setting the control code of the action table to the control code specially for adding image, as defined in the bottom line in FIG. 7(b). When the user operates the mouse 39 and drag-and-drops the menu item for adding information image into the window 402 (second management area) of the image data process, the MPU 31 detects this operation and refers to the image-related information (FIG. 7 (b)). When the control code of the action table corresponding to the operated menu item is checked up to confirm that it is "image addition", accessing the corresponding pointer is started. When a new information image file is downloaded from a prescribed server in response to this access, the MPU 31 supplies the newly downloaded information image file to the image data process 304, as in the processing of supplying an information image file from the browser 303 to the image data process 304.

According to this method, in which a new information image file is supplied, there is available an advantage that it is not necessary to start up the browser for each run of operation.

It is needless to mention that downloading of a new information image file and supply thereof to the image data process 304 may be done by clicking the menu item for adding information image simply on the mouse 39.

The new information image file may be stored in an already supplied information image file. In this case, when the menu item for adding information image (first management area) is drag-and-dropped, the MPU 31, not accessing the server on the network, but refers to the image-related information of the information image file which is the object of the current run of operation, reads out another information image previously registered therein, and supplies the same to the image data process 304 (second management area).

In this case, where the new information file is supplied, there is available an advantage of eliminating the necessity to connect to the server on the network for each run of operation.

(2) Drag-and-Drop From Mail Software

The information image file may be supplied to the image data process 304 by drag-and-dropping the information image file attached to the mail software into the window 402 of the image data process. A perusal window of the main text or a confirmation window of the attached file serves as a first management area. In this case, it is possible to cause circulation of the information image file on electronic mail for receiver's use, thus permitting effective diffusion of the information.

(3) Drag-and-Drop From an Arbitrary Folder

The information image file once copied on a prescribed folder from the browser or the mail software may be supplied by drag-and-dropping the same from that folder (first management area) to the window 402 (second management area) of the image data process. The MPU 31 detects drag-and-drop operation from an arbitrary folder to the window 402 of the image data process, and supplies the information image file to the image data process 304 as in the above-mentioned case of drag-and-drop processing from the browser.

(4) Supplying Method Other Than Drag-and-Drop

Supply of the information image file to the image data process 304 is achievable also by using another operation in place of the above-mentioned drag-and-drop operation. For example, the information image file may be supplied to the image data process 304 as a result of MPU 31's detection of the fact that the information image file managed outside the image data process 304 was clicked. The information image file may be supplied to the image data process by copying the information image file managed outside the image data process 304 onto a clip-board, and subsequently, when the information image file is pasted to the window 402 of the image data process from the clip-board, causing the MPU 31 to detect this operation.

(5) Supply from a Recording Medium Such as CD-ROM

The information image file may also be supplied from a machine-readable recording medium such as a CD-ROM. In this case, the information image file displayed in the folder (first management area) of the CD-ROM may be supplied to the image data process 304 (second management area) through already described drag-and-drop operation, a click operation, or a copy-and-paste operation, or the information image file may be supplied to the image data process 304 by automatically starting up an installer upon starting the CD-ROM, and causing this installer to supply the information image file recorded in the CD-ROM or the like to the image data process 304. When an installer supplies an information image file, the installer may inspect the information image file already supplied to the image data process 304, and selects only the information image files not as yet supplied to supply the same to the image data process 304.

According to this method, it is possible to circulate the information image file as a supplement to a magazine, or distribute the same to many and unspecified users for use.

[Structure of First and Second Management Areas]

The first management area and the second management area may be provided by windows (processes, programs) independent of each other, as shown in FIG. 4, or may be implemented in any other form. Several embodiments will be presented.

Figure 11:
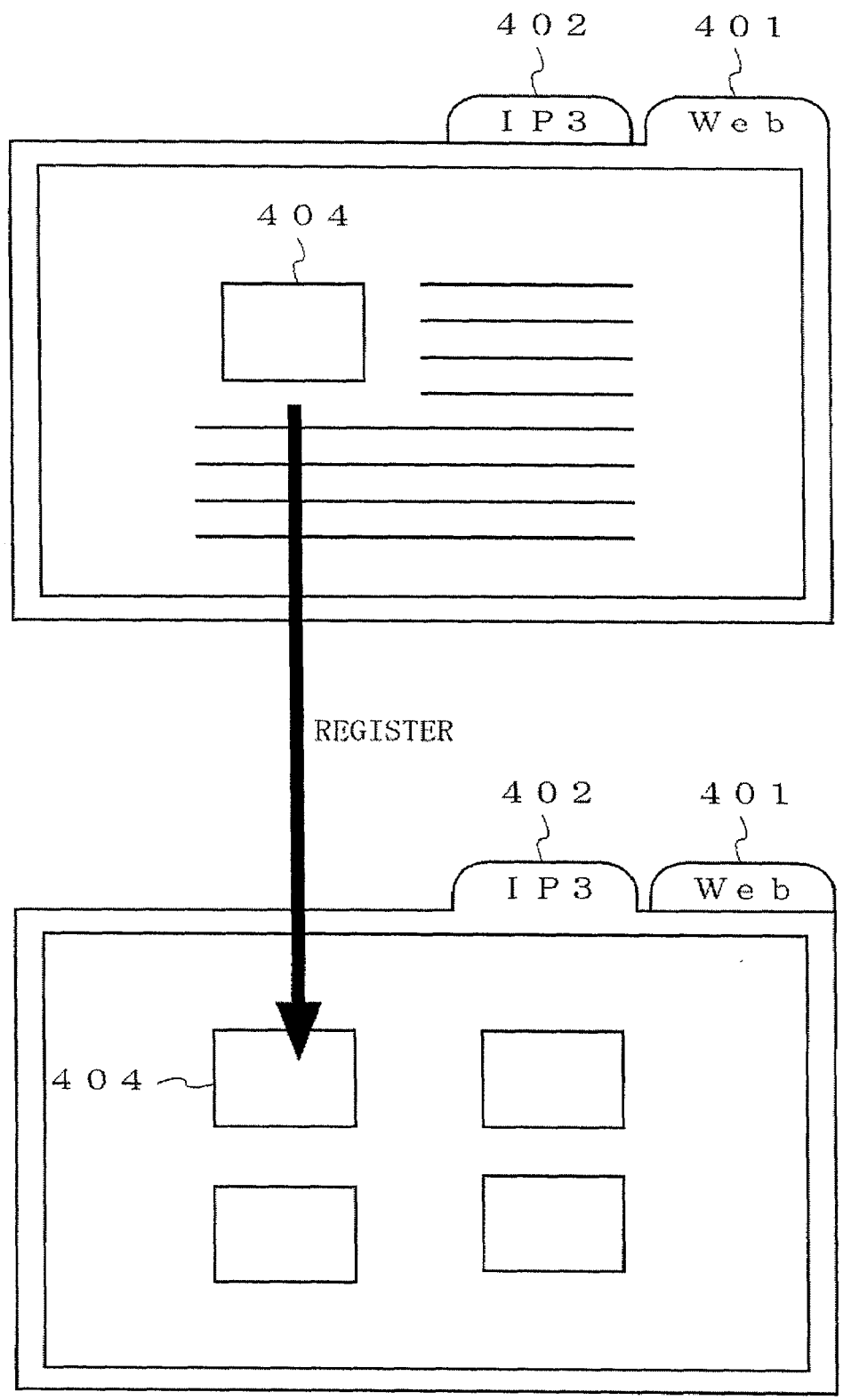
FIG. 11 is a descriptive view of an embodiment in which tab selection is switched over between display of a first management area and a second management area.

FIG. 11 illustrates an embodiment in which the window 401 of the Web browser and the window 402 of the image data process are provided by a single program; a display selecting tab at the top of the window is selected through operation of input means 35; and the selected side window is selectively displayed on the screen. First, the information image file 404 displayed in the window 401 of the Web browser is accessed and registered in the window 402 of the image data process on the background. Access to the information image file 404 can be made by any of the aforementioned methods. Then, the window 402 of the image data process is displayed by operating the display selecting tab through the input means 35. This makes it possible to access the information image files already registered in the image data process.

Figure 12:
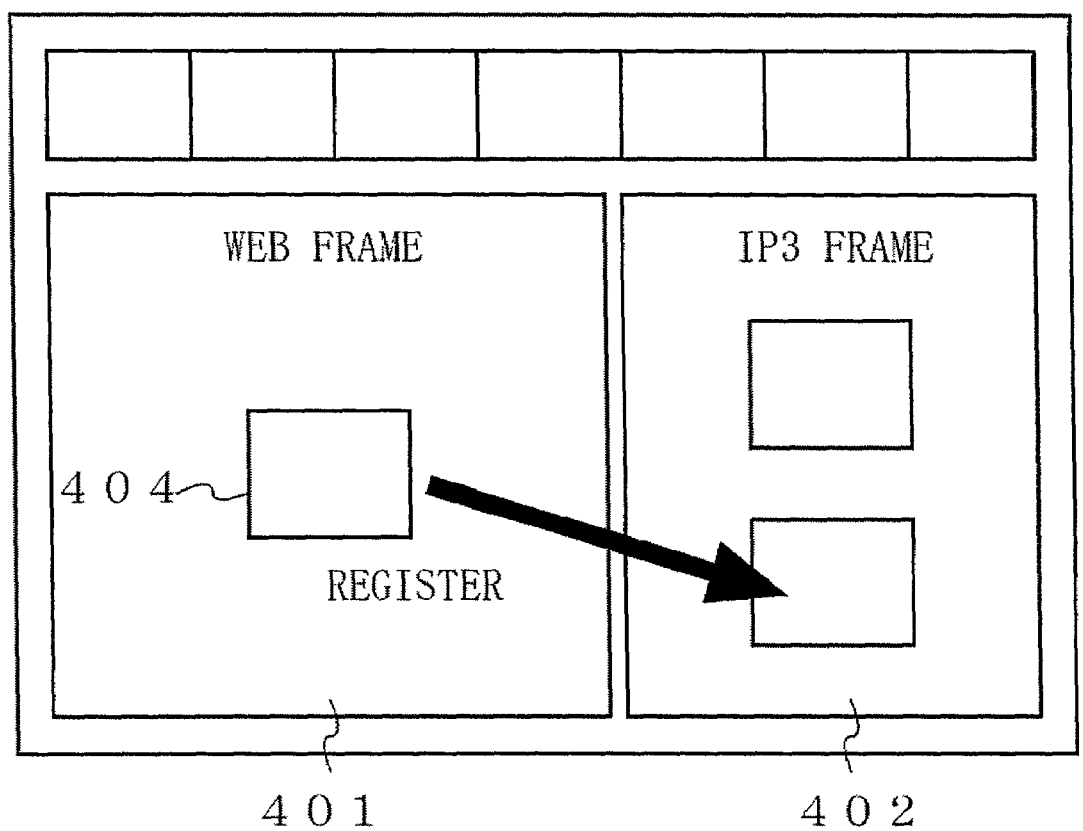
FIG. 12 is a descriptive view of an embodiment in which a first management area and a second management area are separated by a frame and displayed simultaneously.

FIG. 12 illustrates a case where frame-structured display windows are provided, one as the window 401 of the Web browser, and the other as the window 402 of the image data process. In this case, it is easy to conduct an accessing operation of drag-and-dropping the information image file 404 from the frame 401 of the Web browser to the frame of the image data process. It is of course possible, however, to supply the information image file to the image data process by any of the aforementioned accessing methods.

Figure 13:
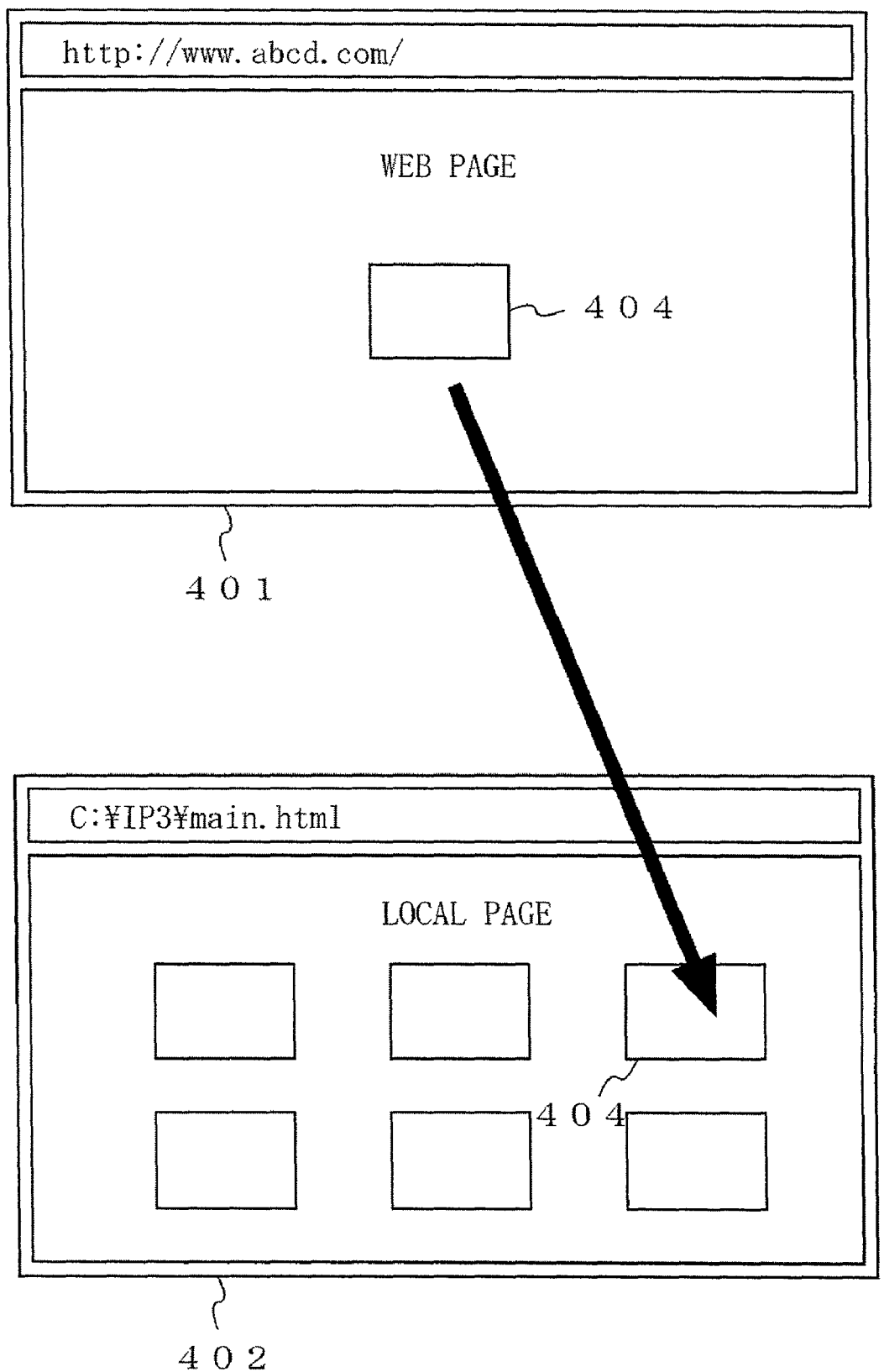
FIG. 13 is a descriptive view of an embodiment in which, when accessing the information image file in the first management area (HTML), the second management area (HTML) is displayed after being updated, thus managing a new information image file.

In FIG. 13, when making an access to the information image file 404 displayed in the window 401 of the Web browser, processing means 31 starts up a plug-in previously implemented in the Web browser. Any of the aforementioned accessing methods to the information image file may be adopted. The started plug-in adds management of a new information image file to a local HTML file stored previously in storage means 33 as a second management area. After addition of the new information image, the local HTML file is deployed as a second management area 402 in the Web browser. When deploying the local HTML file in the Web browser, the browser may be an existing Web browser, or a new Web browser may be started up and separately deployed.

[Encryption of Image-Related Information]

Encryption of the image-related information to be added to the image data will now be described.

[Encryption in Server Unit]

The identity information adding process 205 of the server unit 20 has a function of adding image-related information to be added to the image data after encryption. The encryption algorithm is updated at prescribed time intervals. By encrypting the image-related information, it is possible to prevent a third party from using the image file by adding, deleting or modifying illegally the image-related information.

[Encryption in Terminal Unit]

In the terminal unit 30, when referring to the image-related information added to the image data, the MPU 31 decodes the image-related information. The decoding algorithm is previously stored in the HDD 33 in a manner corresponding to the encryption algorithm in the server unit 20. However, since the encryption algorithm of the server unit 20 is updated at certain time intervals, it is necessary to update the decoding algorithm of the terminal unit 30 so as to meet the encryption algorithm when updating the encryption algorithm of the server unit 20.

[Update of Decoding Algorithm]

The server unit 20 manages versions of the decoding algorithm stored in the terminal unit 30 in a database for each ID (IP address and the like) of the terminal unit. When updating the encryption algorithm of the image-related information in the server unit 20, flags are provided for IDs of all the terminal units. For a terminal unit subsequently making access to the server unit 20 having a flag corresponding to the ID of that terminal unit, a decoding algorithm corresponding to the new encryption algorithm is transmitted for update, and flags corresponding to IDs of the terminal units for which update has been completed are cancelled. The decoding algorithm is stored in the HDD 23 of the server unit.

The image data process 304 has a function of trying to decode the image-related information contained in an information image file upon supply of the information image file, and checking up whether or not the data structure of the decoded image-related information is normal. If the data structure after decoding is not normal, supply of that information image file is discontinued. As a result, it is possible to prevent supply of an illegally modified information image file. Determination of an illegal information image file may be based on the identity information added to the image data.

[Accounting Process]

The accounting method applied when supplying the information image file from the browser to the image data process 304 will now be described. Accounting is conducted, when supplying the information image file from the browser to the image data process 304, by that image data process 304 requesting accounting process by accessing the server unit 20.

The access log (generation log) described in the embodiments of the invention is generated under condition that the information image file has been supplied from the browser to the image data process 304 in the terminal unit 30. That is, when the information image file is supplied to the image data process 304, the MPU 31 extracts the identity information embedded in the information image file from the supplied information image file, and transmits this identity information and the file name of the information image file to the server unit 20. The server unit 20 correlates the received identity information and the image file name with the accessing terminal IP address, the host name, and the date and time of access, and generates a generation log (FIG. 3) described above. Therefore, the fact that the information image file was supplied to the image data process in the terminal unit 30 is recorded in the access log of the server unit 20.

[Accounting Process (1)]

The first accounting method comprises accounting only for the first supply and not accounting for the second and subsequent supplies when the same information image file is supplied through the same terminal (or the same user, or image data process 304 having the same ID). When an information image file is supplied to the image data process 304, the MPU 31 of the terminal unit transmits intrinsic identity information imparted to the information image file and the file name of the information image file to the server unit 20, and proposes accounting to the server unit 30. Upon receipt of the proposal of accounting, the MPU 21 of the server unit compares the IP address of the accessing terminal and the host name, as well as the received identity information and the image file name with those recorded in the generation log, and determines whether or not the same information image file has ever been supplied at the same terminal to the image data process 304 in the past. As a result, if the same image file has been supplied, accounting is not made for the current supply. On the other hand, if the same information image file has never been supplied to the image data process 304 at the same terminal, the supply is subjected to accounting as a new supply.

[Accounting Method (2)]

The second accounting method is the same as the first accounting method except that, even for a supply of the same information image file at the same terminal, accounting is made if it is a supply on another date. A conceivable usage of the information image file is that, within an effective period, free contents service is available. In such a case, if the same information image file can be supplied repeatedly without accounting at the same terminal, the effective period for the free contents service would lose its meaning. Therefore, even for the supply of the same information image file at the same terminal, one on another date is subjected to accounting.

When the information image file is supplied to the image data process 304, the MPU 31 of the terminal unit transmits the intrinsic identity information imparted to the information image file and the file name of the information image file to the server unit 20, and proposes accounting to the server unit 30. Upon receipt of this proposal of accounting, the MPU 21 of the server unit compares the IP address of the accessing terminal and the host name, as well as the received identity information and the image file name with those recorded in the generation log to see whether or not quite the same data have been registered on the same date. As a result, if it is registered on the same date, no accounting is made. On the other hand, if it is not registered on the same date, the current supply of the information image file is subjected to accounting.

[Accounting Method (3)]

In the same method as the first and second accounting methods, the same user may be determined, not with the same terminal. In this case, a user authentication organization (function) is provided in or outside the server unit 20. When access is requested from the terminal unit 30 to the server unit 20, the user authentication organization requests authentication to the user, and permits access to the server unit 30 when user authentication is properly conducted. According to this method, it is possible to identify the user. It is therefore possible to determine, for each user, whether or not the same information image file has ever been supplied to the image data process 304 in the past.

For embedding the image-related information in the information image file (icon), there are available the method of icon-type packaging described above, and implementing in the form of a package by use of Java (trademark) applet or ActiveX (trademark) control. The Java applet and the ActiveX control are program units permitting execution of browser software such as Netscape (trademark) or Internet Explorer (trademark). The execution codes thereof are written in Java intermediate code for the Java applet, and in CPU native code for the ActiveX control, and the browser can start execution in the both cases. Both the Java applet and the ActiveX control permit graphic display on the browser display screen. When using Java applet or ActiveX control, an applet for image display alone is provided in place of the icons having embedded related information. In place of display of these icons by use of tags on the browser (IMG), it suffices to cause implementation of the applet by using (EMBED) or (APPLET). Embedding of the related-information may be accomplished in the program form in the both cases.

INDUSTRIAL APPLICABILITY

According to the present invention, intrinsic identity information is generated in response to an access from a terminal. The generated identity information is added to prescribed image data provided by an information providing server unit, and the corresponding relationship between the identity information and the image data containing the added identity information is recorded. By referring to this corresponding relationship, it is possible to obtain information regarding user access corresponding to the identity information added to the image data, such as the address of the terminal used by the user, the time of access and the like. It is therefore possible to relatively easily conduct an investigation of access status from the terminal.

In another aspect of the invention, by providing identity information adding means separately from the information providing server unit, it is possible to individually set access limitation, and to improve setting flexibility.

In still another aspect of the invention, by acquiring the image data containing the added intrinsic identity information from the information providing server unit, and extracting the identity information from the thus acquired image data, it is possible to perform management of the image data meeting the identity information.

For example upon updating image data, by requesting processing to the information providing server unit by transmitting this identity information, it is possible to obtain image data corresponding to the identity information or information meeting user access, and it becomes easier to select a processing corresponding to the information.

The invention claimed is:

1. An information use terminal comprising:
   image data acquiring means which acquires image data containing added intrinsic identity information from an informant server providing at least image data;
   identity information extracting means which extracts said identity information from the image data acquired by said image data acquiring means;
   means for requesting updating of the image data by notifying said informant server of said extracted identity information; and
   image data updating means which provides image data having added new identity information in response to the request for updating from said informant server to update the image data,
   wherein said identity information is embedded in the image data.

2. An information use terminal according to claim 1, comprising:
   a managing means which manages said acquired image data in response to the identity information extracted by said extracting means.

3. An information use terminal according to claim 1, wherein said image data are publicity image data.

4. A machine-readable medium in which an information use program is recorded for:
   acquiring image data having added intrinsic identity information from the informant server which provides at least image data;
   extracting said identity information from said acquired image data;
   requesting updating of the image data by notifying said informant server of said extracted identity information; and
   providing the image data having added new identity information in response to this request for updating, thereby updating the image data,
   wherein said identity information is embedded in the image data.

5. A machine-readable recording medium according to claim 4, wherein said image data are publicity image data.

6. An accounting unit comprising:
   receiving means which, in the presence of image data containing added identity information meeting an access from an information use terminal, receives said image identity information extracted by said information use terminal from the image data from said information use terminal, and receives terminal identity information of said information use terminal;
   storage means which correlates and stores said image identity information and said terminal identity information received by the receiving means; and
   information processing means which determines whether or not the same combination of image identity information and terminal identity information has already been stored in the storage means, so that accounting is not made when said combination is stored, and accounting is made when said combination is not stored,
   wherein said identity information is embedded in the image data.

7. An accounting unit comprising:
   receiving means which, in the presence of image data containing added identity information meeting an access from an information use terminal, receives said image identity information extracted by said information use terminal from the image data from said information use terminal, and receives terminal identity information of said information use terminal;
   storage means which correlates and stores a date on which the receiving means received said image identity information and terminal identity information, with said image identity information and terminal identity information; and information processing means which determines whether or not the same combination of image identity information, terminal identity information and the receiving date has already been stored in the storage means, so that accounting is not made when said combination is stored, and accounting is made when said combination is not stored, wherein said identity information is embedded in the image data.

8. An accounting unit comprising:

receiving means which, in the presence of image data containing added identity information meeting an access from an information use terminal, receives said image identity information extracted by said information use terminal from the image data from said information use terminal, and receives user identity information of the user using said information use terminal from said information use terminal;

storage means which correlates and stores said image identity information and said user identity information received by the receiving means; and information processing means which determines whether or not the same combination of image identity information and user identity information has already been stored in the storage means, so that accounting is not made when said combination is stored, and accounting is made when said combination is not stored, wherein said identity information is embedded in the image data.

* * * * *